ns Patent [19]

Bartz

[11] 4,312,730
[45] Jan. 26, 1982

[54] HEAT-CURABLE AQUEOUS COATING COMPOSITIONS FOR ANODIC DIP-ELECTROCOATING

[75] Inventor: Wilfried Bartz, Marl, Fed. Rep. of Germany

[73] Assignee: Chemische Werke Huels, AG, Marl, Fed. Rep. of Germany

[21] Appl. No.: 205,130

[22] Filed: Nov. 10, 1980

[30] Foreign Application Priority Data

Nov. 10, 1979 [DE] Fed. Rep. of Germany ....... 2945569

[51] Int. Cl.³ .............................................. C25D 13/00
[52] U.S. Cl. .............................. 204/181 R; 260/29.3; 260/29.4 UA; 260/29.7 H
[58] Field of Search .................. 260/29.7 H, 29.4 UA, 260/29.3; 204/181 R

[56] References Cited

U.S. PATENT DOCUMENTS 3,654,203  4/1972  Dalmar et al. ................ 260/19 UA
4,111,872  9/1978  Dworak .......................... 260/23.7 A Primary Examiner—Joseph L. Schofer
Assistant Examiner—Bernard Lipman
Attorney, Agent, or Firm—Millen & White

[57] ABSTRACT

A binder for a bakable aqueous anodic electrocoating composition comprises a water-soluble and/or water-dispersible addition compound, at least partially neutralized with a basic compound and esterified, the addition compound comprising 10–35% by weight of one or more α,β-unsaturated dicarboxylic acids and 65–90% by weight of a butadiene polymer, liquid at 20° C. and having at least 50 molar percent butadiene units and a molecular weight of 400 to 6,000, the addition compound being esterified to 20–70 equivalent percent, based on its acid number, with one or more unsaturated alcohols of the formula

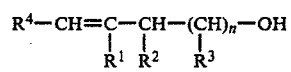

wherein
R¹, R², and R³ are identical or different and each independently is hydrogen or methyl,
R⁴ is hydrogen or $C_{1-5}$-alkyl,
and
n is 0 or 1.

8 Claims, No Drawings

HEAT-CURABLE AQUEOUS COATING COMPOSITIONS FOR ANODIC DIP-ELECTROCOATING

BACKGROUND OF THE INVENTION

The present invention relates to aqueous coating compositions dryable by baking and useful for anodic dip-electrocoating.

Such compositions are based on a binder of a water-soluble and/or water-dispersible addition compound which is at least partially neutralized with basic compounds and esterified, the addition compound comprising 10-35% by weight of one or several $\alpha,\beta$-unsaturated dicarboxylic acids and 65-90% by weight of a butadiene polymer, which is liquid at 20° C., contains at least 50 molar percent butadiene units and has a molecular weight of 400 to 6,000. They also optionally contain minor amounts of an organic solvent and the customary auxiliary agents and additives.

Such coating compositions are basically conventional (British Pat. No. 1,102,652) and are primarily used for electrophoretic coating methods. The coatings produced from these coating compositions, however, are unsatisfactory from the viewpoint of corrosion protection. Subsequent developments had sought improvement by optimizing the polybutadiene component or by employing additional resins. However, the attained effects nowadays no longer satisfy the increased requirements for corrosion protection, particularly in the field of automobile primer coatings.

SUMMARY OF THE INVENTION

Accordingly, it is an object of this invention to avoid the aforedescribed disadvantages while retaining the good general properties of these coating compositions.

Upon further study of the specification and appended claims, further objects and advantages of this invention will become apparent to those skilled in the art.

These objects have been attained by the expedient of esterifying the addition compound to an extent of 20-70 equivalent percent, based on the acid number, with one or several alcohols of the formula (I)

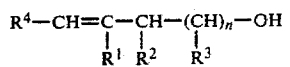

wherein
$R^1$, $R^2$, and $R^3$ are identical or different and each independently is hydrogen or methyl,
$R^4$ is hydrogen or alkyl of 1-5 carbon atoms, and
n is 0 or 1.

DETAILED DESCRIPTION

The amount of unsaturated alcohol used according to this invention is preferably such that 25-45 equivalent percent of the addition compound, based on the acid number, is esterified. The acid numbers are determined by titration with KOH in pyridine/water.

Unless indicated otherwise herein, details of the conventional portion of the binders of this invention and their preparation are well known or readily determinable by routine experiments, e.g., as disclosed in British Pat. No. 1,102,652, whose disclosure is incorporated by reference herein.

Especially suitable unsaturated alcohols for the coating compositions of this invention include, for example, allyl alcohol, methallyl alcohol, crotyl alcohol, 1-buten-3-ol, 2-ethyl-2-hexen-1-ol. These alcohols can be utilized alone or in mixtures.

In addition to the unsaturated alcohols of this invention, saturated alcohols can also be utilized, e.g., saturated hydrocarbon- or alkoxy substituted hydrocarbon-alcohols of 1-8 C atoms or benzyl alcohol. Examples of such alcohols include methanol, ethanol, propanols, butanols, ethylene glykol monoalkyl ethers of 1-4 carbon atoms in the alkyl residue etc.

Preferred unsaturated alcohols according to this invention, as well as preferred additional saturated alcohols, are those which possess primary hydroxy groups.

The sum total of the amounts of unsaturated and saturated alcohols is to be selected, preferably, so that at least 40 equivalent percent of the carboxy groups is esterified.

The basic polymers used for production of the addition compounds are conventional butadiene homo- and/or copolymers. Suitable comonomers are, in particular, other conjugated diolefins, such as, for example, 1,3-pentadiene, isoprene, and similar compounds. Furthermore, aliphatic monoolefins, such as ethylene, propylene, or aromatic vinyl compounds, e.g. styrene, can be utilized as comonomers in amounts of up to 30 mole%. The basic polymers contain at least 50 mole%, preferably at least 70 mole%, and especially at least 90 mole% of butadiene units. Binders containing homopolybutadienes as the polymer are especially suitable for the coating compositions of this invention. The molecular weights of the basic polymers range from 400 to 6,000, preferably from 700 to 5,000 or, when butadiene homopolymers are used, from 850 to 5,000. The molecular weights are determined by vapor pressure osmometry.

For the reaction with the $\alpha,\beta$-unsaturated dicarboxy compounds, the butadiene polymers can be utilized directly as they are obtained in their manufacture. However, it is also possible to use mixtures of various polymers and/or to modify the polymers via conventional methods, e.g. partial hydrogenation, isomerization, or cyclization prior to reaction with the $\alpha,\beta$-unsaturated dicarboxy compounds.

Within the scope of this invention, the base polymers are preferably butadiene polymers wherein at least 30%, preferably more than 40%, of the existing double bonds are 1,4-double bonds. Among these, those are preferred wherein at least 20% of the total double bonds present exist in the form of cis-1,4-double bonds. For butadiene polymers wherein the proportion of vinyl-type double bonds is at most 40%, the proportion of cis-1,4-double bonds should be at least 30%.

The addition compound is obtained by chemical addition of $\alpha,\beta$-unsaturated dicarboxylic acids to the butadiene polymers. Such processes, as well as the dicarboxylic acids used for this purpose, are basically known from the state of the art (See, e.g., DOS [German Unexamined Laid-Open Application] No. 2,627,635, whose disclosure is incorporated by reference herein).

Such acids have the formula

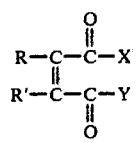

wherein R and R' are an H atom, a halogen atom or an alkyl group; X and Y are a hydroxy group, an alkoxy group or an oxygen bond which is formed of X and Y together, assuming that X and Y are not simultaneously an alkoxy group.

Advantageous α,β-unsaturated dicarboxylic acids as those of 8 carbon atoms or less, such as, for example, maleic acid, chloromaleic acid, fumaric acid, citraconic acid, 1,2-diethylmaleic acid, etc. Instead of the free dicarboxylic acids, the corresponding acid anhydrides are preferably employed. Especially preferred is maleic anhydride, preferably in amounts of 12–25% by weight.

The preparation of the binders of this invention, i.e. the partially esterified addition compounds, is especially advantageous and simple from a technical industrial viewpoint if the starting material addition compounds contain the diacid functions in the anhydride form. The esterified compounds are then produced under gentle conditions, optionally in the presence of small amounts of customary alkaline or acidic catalysts, in the presence of the unsaturated alcohols of this invention, with the formation of acidic monoesters [half esters]. The esterification is carried out conventionally, e.g., analogous to the procedures of U.S. Pat. No. 3,796,770. whose disclosures are incorporated by reference herein.

If the partially esterified addition compounds still contain intact anhydride groups, it is advisable to conventionally hydrolyze the remaining unreacted anhydride groups before neutralization. This measure is particularly indicated when there are utilized for the neutralization organic bases which react with anhydride groups forming covalent bonds.

The partially esterified binders of this invention must still exhibit a sufficiently high residual acid number to possess sufficient water solubility and/or dispersing capacity after neutralization. To attain good processability, especially considering the special requirements of dip-electrocoating, those products are preferred which exhibit acid numbers of 40 to 150, especially of 60 to 120 mg KOH/g.

The partially esterified addition compounds of butadiene polymers and α,β-unsaturated dicarboxylic acids can be rendered water-soluble or water-dispersible according to prior-art methods. (See, e.g., U.S. Pat. No. 3,518,213 or 3,654,203 whose disclosure is incorporated by reference herein). This is done by at least partially neutralizing the addition compounds with an alkaline compound, such as, for example, an organic amine, ammonia or an inorganic alkali compound. Examples of such alkaline compounds are methylamine, ethylamine, ethylmethylamine, dimethylamine, diethylamine, trimethylamine, triethylamine; mono-, di-, or tributylamines; mono-, di-, or triethanolamines; N,N-diethylethanolamine, N,N-dimethylethanolamine, N-methylmorpholine, sodium hydroxide, potassium hydroxide, ammonium carbonate etc.

To obtain sufficient water solubility or dispersing capacity of the aforedescribed binders in water, the amount of alkaline compounds added must be sufficiently high. The higher the residual acid number of the addition products, the lower are the degrees of neutralization permissible for attaining the desired effect. The required minimum amount is normally 0.3–0.5 equivalents of base per acid equivalent. However, for the binders of this invention, there is no reason adverse to the use of even super-stoichiometric amounts of, for example, 1.5–2.0 equivalents of base per acid equivalent. Thus, a person skilled in the art is able to vary the electrophysical characteristic data of the coating compositions of this invention within a wide range by varying the degree of neutralization. The coating compositions can thus be optimally adapted to the respective apparatus conditions and existing application requirements, e.g., with respect to anodic deposition. However, preferably the alkaline compounds are used in amounts less than stoichiometric. Degrees of neutralization of 0.5–0.8 equivalent of base/acid equivalent have proved to be favorable.

The thus-neutralized binders are dilutable with water to an unlimited extent. However, it has been found under practical conditions that the addition of organic solvents or solvent mixtures makes it easier to process the binders and increases the stability of the aqueous coating compositions and/or improves the flow properties of the not yet baked coatings. These measures are basically known to those skilled in the art and can be accomplished using known procedures and solvents such as those disclosed in British Pat. No. 1,102,652 or U.S. Pat. No. 3,519,213. which is incorporated by reference herein. Examples of solvents suitable for the aforementioned purpose include isopropanol, butanols, diacetone alcohols, alkyl "Cellosolves" and dimethyl ethers of glycols. These solvents can be utilized in amounts of up to 100 parts by weight, preferably of 5–50 parts by weight per 100 parts by weight of binder. The solvents are normally added before, during, or after the neutralization stage. If inert solvents are involved, it is occasionally even advantageous to add them to the addition compounds prior to the esterification.

The coating compositions of this invention are usually formulated with a solids content of 1–30% by weight, preferably 5–20% by weight. However, they can also be applied using other known methods, such as dipping, spraying, or flooding, although with higher solids contents. The coating compositions can contain the customary pigments, stabilizers, fillers, etc. as well as the other conventional auxiliary agents and additives.

Since the binders of this invention possess the property of drying under oxidation, it is usually unnecessary to add to coating compositions containing them, additional resins as crosslinking agents. It is, of course, possible, to employ concomitantly other binders acting as crosslinking agents, e.g. aminoplasts or phenolic resins. Especially suitable in these cases are commercially available aminoplasts or phenolic resins both of which carry methylol or alkoxymethyl groups. (See, e.g., related U.S. application Ser. No. 205,129, filed on even date, whose disclosure is incorporated by reference herein.)

Furthermore, the coating compositions of this invention can be utilized in combination with other conventional binders capable of anode deposition, such as, for example, carboxy-group-containing hydrocarbon resins or epoxy esters. The proportion of foreign resins in the total binder, however, is not to exceed 40% by weight.

The binders of this invention, as well as the foreign resins serving as crosslinking agents can be processed by simple physical admixture to form coating compositions of this invention. In many cases, especially when using resins having a relatively low molecular weight, it is advantageous to subject the mixture prior to further processing to a precondensation at an elevated temperature, for example temperatures in the range of 70° to 150° C. Such precondensates normally show improved properties from a painting technology viewpoint as compared to the physical mixtures per se.

For electrophoretic deposition, voltages can be applied in the range of 10 to 500 volts, preferably 50–300 volts. The bath temperatures should be in the range of 10° to 40° C., preferably 20° to 30° C.

The coating compositions of this invention are usually baked at temperatures of 120° to 250°, preferably 140° to 190° C., within 10–60 minutes, preferably 15–40 minutes.

The aqueous coating compositions of this invention have an excellent shelf stability. In this respect, they are equal to the prior-art coating compositions based on the corresponding addition compounds esterified with saturated alcohols; however, they are superior to binders modified with monomeric acrylates. The coatings obtained using the coating compositions of this invention possess good general properties, such as hardness, elasticity, and waterproofness. With respect to corrosion protection, they exceed by far the coating compositions of the state of the art.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

EXAMPLES

A. Basic Polymers

The following basic polymers (1) through (3) were used for preparing the coating compositions of this invention:

(1) Homopolybutadiene (iodine number according to Wijs: 445; 1,4-cis: 1,4-trans: vinyl = 73: 25: 2; molecular weight: 1,700; viscosity/20° C.: 0.8 Pa·s).

(2) Homopolybutadiene (iodine number according to Wijs: 435; 1,4-cis: 1,4-trans: vinyl = 52: 11: 37; molecular weight: 1,600; viscosity/20° C.: 1.2 Pa·s).

(3) Homopolybutadiene (iodine number according to Wijs: 446; 1,4-cis: 1,4-trans: vinyl = 33: 47: 20; molecular weight: 4,540; viscosity/20° C.: 3.9 Pa·s).

B. Preparation of the Esterified Addition Compounds (1) 2,451 g of basic polymer A(1) and 549 g of maleic anhydride (MA) were reacted in the presence of 3 ml of acetylacetone and 36 g of Cu naphthenate solution (10% Cu) under nitrogen in an agitated vessel for 1 hour at 180° C. and subsequently for 3 hours at 190° C. The MA adduct contained ≦0.1% by weight of free MA and had an acid number of 167 mg KOH/g (titrated with KOH in pyridine/water). 900 g of the MA adduct was esterified with 70 g of allyl alcohol in the presence of 2 g of triethylamine for a period of 1 hour at 80° C., then for 2 hours at 90° C., and finally for 1 hour at 100° C. Product B(1) had an acid number of 95 mg KOH/g. The degree of esterification, based on the acid number of the MA adduct, amounted to 40 equivalent percent.

(2) 900 g of the above-described MA adduct was esterified analogously first with 38.9 g of allyl alcohol up to an acid number of 122 mg KOH/g, corresponding to 24% esterification, and then with 25.7 g of methanol. The final acid number of B(2) was 92 mg KOH/g corresponding to a total degree of esterification of 41 equivalent percent.

TABLE 1

| | Characteristic Data According to B(4) (Weight Ratio Basic Polymer: MA = 81.7:18.3) | | | |
|---|---|---|---|---|
| Addition Compound No. | Basic Polymer | Alcohol | Degree of Esterification* [%] | Acid Number [mg KOH/g] |
| B(4) | A(1) | 1-Buten-3-ol | 33 | 104 |
| B(5) | A(2) | Allyl Alcohol | 40 | 104 |
| B(6) | A(3) | Allyl Alcohol | 40 | 107 |
| X | A(3) | Methanol | 44 | 105 |

*Calculated with reference to the acid number of the MA adduct.

(3) 900 g of the MA adduct corresponding to B(1) was reacted with 87 g of crotyl alcohol in the presence of 3 g of triethylamine for 1 hour at 80° C., for 2 hours at 90° C., and then for 2 hours at 100° C. The acid number of product B(3) was 90 mg KOH/g corresponding to a degree of esterification of 40 equivalent percent.

(4) In correspondence with the modes of operation set forth in (B), the binders B(4)–B(6) as well as X were produced as set forth in Table 1.

C. Production of Coating Compositions and Coatings

Example 1

360 g of product B(1) was dissolved in 154.3 g of diacetone alcohol and mixed with 57.6 g of titanium dioxide (rutile), 46.8 g of kaolinite, and 3.6 g of carbon black. The mixture was ground on a three-roller mill to a grain fineness of <5 μ.m.

500 g of the thus-obtained paste was stirred together intensively with 100 g of 5% aqueous ammonia for 30 minutes; then, the volume was replenished under stirring with fully demineralized water to 2,892 g. The thus-obtained aqueous coating composition has a pH of 7.5, its binder content was 10% by weight; pigment content: 30% by weight, based on the binder.

After allowing the coating composition to age for 24 hours at 40° C., a film could be deposited within 2 minutes on a zinc-phosphated steel sheet connected as the anode at a bath temperature of 25° C. and an applied voltage of 160 volts; after rinsing with fully demineralized water and baking at 180° C./20 minutes, this film resulted in an elastic coating free of surface imperfections with a layer thickness of 25 μ.m.

EXAMPLES 2–6 and A

In correspondence with Example 1, aqueous coating compositions were prepared, and anodically deposited coatings were produced.

Products characterized by letters are not in accordance with this invention.

TABLE 2

| | Blister Formation in Salt Spray Test (ASTM B 117 - 35° C., 5% NaCl Solution) | |
|---|---|---|
| Example No. | Addition Compound No. | Salt Spray Test [h]/ Amount of Blisters Having a Size of ≳g 2* |
| 1 | B(1) | 750–1,000/m 1–2 |
| 2 | B(2) | 750/m 1 |
| 3 | B(3) | 500/m 1 |
| 3 | B(3) | 500/m 1 |
| 4 | B(4) | 336/m 1 |
| 5 | B(5) | 750/m 1–2 |
| 6 | B(6) | 500/m 2 |

TABLE 2-continued

Blister Formation in Salt Spray Test
(ASTM B 117 35° C., 5% NaCl Solution)

| Example No. | Addition Compound No. | Salt Spray Test [h]/ Amount of Blisters Having a Size of ≳ 2* |
|---|---|---|
| A | X | 240/m 1-2** |

*Data represent the duration [h] of the salt spray test until blisters having a size ≳ g 2, as well as their amount [m] up to this point in time. Evaluation of the blisters is done according to DIN [German Industrial Standard] 53 209.
**After 500 h crack formation and extensive loss of adhesion.

TABLE 3

Blister Formation Upon Storage in Fully Demineralized Water at 40° C., Measured on 25 μ Films

| Example No. | Addition Compound No. | Days Until Occurrence of Blisters ≳2 g/ Amount[1] | Tear-Off[2] (% of Area) |
|---|---|---|---|
| 6 | B(6) | 7/m 4 | <10 |
| A | X | 2/m 5 | about 80 |

[1]Evaluation of blisters according to DIN 53 209; test conducted along the lines of ISO 1521: the painted metal sheets were placed in water so that they were half submerged, in a glass container provided with a lid; testing temperature 40 ± 1° C. Evaluation was conducted after 2, 4, 7, 9, and 14 days, on the immersed surface area as well as on the surface area in the vapor space.
[2]Adhesion is tested by tearing off with a 50 mm crepe tape 1 h after taking the sheets out of the water at the end of the test (14 days) and storage at room climate conditions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A heat curable aqueous anodic electrocoating composition comprising (a) a water-soluble and/or water-dispersible addition compound at least partially neutralized with a basic compound and esterified, the addition compound comprising 10-35% by weight of one or more α,β-unsaturated dicarboxylic acids up to 8 carbon atoms and of the formula

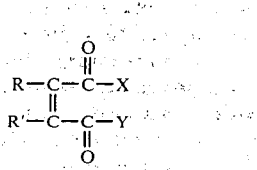

wherein R and R' are an H atom, a halogen atom or an alkyl group; X and Y are a hydroxy group, an alkoxy group or an oxygen bond which is formed by X and Y together, assuming that X and Y are not simultaneously an alkoxy group; and 65-90% by weight of a butadiene polymer, liquid at 20° C. and having at least 50 molar percent butadiene units and a molecular weight of 400 to 6,000, the addition compound being esterified to 20-70 equivalent percent, based on its acid number, with one or more unsaturated alcohols of the formula

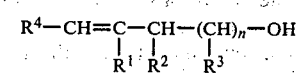

wherein
   $R^1$, $R^2$, and $R^3$ are identical or different and each independently is hydrogen or methyl,
   $R^4$ is hydrogen or $C_{1-5}$-alkyl, and
   n is 0 or 1, and
   (b) water.

2. A composition of claim 1 wherein in addition to the unsaturated esterifying alcohol, the addition compound is also esterified with a saturated alcohol.

3. A composition of claim 1 wherein the butadiene polymer of the addition compound is homopolybutadiene.

4. A composition of claim 1 wherein the degree of neutralization of the addition compound is 0.3-0.8 equivalent of base per acid equivalent.

5. A coating composition of claim 1 further comprising an organic solvent.

6. A coating composition of claim 5 further comprising a pigment, a filler or another adjuvant conventional for such coating compositions.

7. A method of anodic dip-electrocoating a metallic surface comprising anodic dip-electrocoating the surface using a coating composition of claim 1.

8. A method of claim 7 further comprising heating, at 120°-250° C., the coating on the metallic surface after it has been dip-electrocoated.

* * * * *